United States Patent
Tsukio et al.

(10) Patent No.: US 7,379,708 B2
(45) Date of Patent: May 27, 2008

(54) MOBILE RECEIVER

(75) Inventors: Yasunobu Tsukio, Osaka (JP); Mamoru Ito, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 32 days.

(21) Appl. No.: 10/551,805

(22) PCT Filed: Apr. 1, 2005

(86) PCT No.: PCT/JP2005/006891

§ 371 (c)(1),
(2), (4) Date: Sep. 30, 2005

(87) PCT Pub. No.: WO2005/096520

PCT Pub. Date: Oct. 13, 2005

(65) Prior Publication Data

US 2006/0217091 A1    Sep. 28, 2006

(30) Foreign Application Priority Data

Apr. 2, 2004    (JP) .............................. 2004-109785

(51) Int. Cl.
*H04B 7/14* (2006.01)

(52) U.S. Cl. ............... 455/25; 455/63.4; 455/562.1; 455/575.7; 342/17; 375/346

(58) Field of Classification Search ............... 455/25, 455/63.4, 562.1, 575.7, 121, 129; 342/17; 375/346

See application file for complete search history.

(56) References Cited

U.S. PATENT DOCUMENTS

| | | | | |
|---|---|---|---|---|
| 5,838,237 A | * | 11/1998 | Revell et al. ............ | 340/573.1 |
| 5,889,488 A | * | 3/1999 | Kosaki ...................... | 342/17 |
| 5,977,907 A | * | 11/1999 | Gross ........................ | 342/354 |
| 6,253,060 B1 | * | 6/2001 | Komara et al. ............ | 455/9 |
| 6,473,627 B1 | * | 10/2002 | Kosaki ...................... | 455/562.1 |
| 6,512,481 B1 | * | 1/2003 | Velazquez et al. ......... | 342/367 |
| 6,640,085 B1 | * | 10/2003 | Chatzipetros et al. ...... | 455/3.02 |
| 6,640,087 B2 | * | 10/2003 | Reed et al. ................ | 455/11.1 |
| 2001/0003443 A1 | * | 6/2001 | Velazquez et al. ......... | 342/367 |

(Continued)

FOREIGN PATENT DOCUMENTS

| JP | 54-72653 A | 6/1979 |
|---|---|---|
| JP | 11-17433 A | 1/1999 |
| JP | 11-154816 A | 6/1999 |
| JP | 2000-307504 A | 11/2000 |

(Continued)

OTHER PUBLICATIONS

International Search Report for PCT/JP2005/006891, dated May 31, 2005.

*Primary Examiner*—Matthew Anderson
*Assistant Examiner*—Minh Dao
(74) *Attorney, Agent, or Firm*—RatnerPrestia

(57) ABSTRACT

A mobile receiver apparatus is provided where its antenna directivity is controllably determined for improving the response to a desired signal as it moves and its surrounding geographical features and thus its environment for signal reception are varied. The mobile receiver apparatus comprises a directivity variable antenna, an antenna controller connected with the directivity variable antenna for conducting a control action to align the directivity with a desired direction, and an optimum directivity calculator connected with the antenna controller for calculating from the current position of a mobile and its surrounding geographical features an optimum pattern of the directivity.

6 Claims, 9 Drawing Sheets

U.S. PATENT DOCUMENTS

| | | |
|---|---|---|
| 2001/0024468 A1* | 9/2001 | Miyashita et al. ........... 375/228 |
| 2002/0142799 A1* | 10/2002 | Chu-Chia et al. ........... 455/556 |
| 2004/0014432 A1* | 1/2004 | Boyle ......................... 455/101 |
| 2004/0104839 A1* | 6/2004 | Velazquez et al. ....... 342/357.1 |
| 2004/0140929 A1* | 7/2004 | Toda et al. ................. 342/372 |
| 2004/0266356 A1* | 12/2004 | Javor et al. .............. 455/67.11 |

FOREIGN PATENT DOCUMENTS

| | | |
|---|---|---|
| JP | 2001-28561 A | 1/2001 |
| JP | 2001-94496 A | 4/2001 |
| JP | 2001-320318 A | 11/2001 |

* cited by examiner

MOBILE RECEIVER

This application is a U.S. national phase application of PCT International Application PCT/JP2005/006891.

TECHNICAL FIELD

The present invention relates to a mobile receiver apparatus for use in an automobile, a train, or any vehicle to receive television broadcast signals, FM radio signals, and AM radio signals.

BACKGROUND ART

A technology is known for electronically changing the directivity of an antenna or namely an adaptive array antenna. A common adaptive array antenna is arranged having an array of antenna elements connected to their respective variable amplifiers and variable phase shifters, in which the output signals of the antenna elements can be combined together to develop a composite signal. The antenna directivity can be modified by electronically controlling the action of the variable devices.

Also known is a GPS system for measuring the current position from electric wave signals from two or more satellites. Using the current position of a movable vehicle determined by the GPS system and the position of a broadcasting tower which emits broadcast signals, the positional relationship between the vehicle and the broadcasting tower is calculated and used for aligning the directivity of an adaptive array antenna with the broadcasting tower. As a result, the reception of a desired broadcast signal can be improved while the effect of multi-path interference remaining minimized.

One of the prior art technologies is disclosed as a citation of the present invention in Japanese Patent Laid-open Publication No. (Heisei)11-17433.

The prior art technology is designed for controllably aligning the directivity of an adaptive array antenna with its target broadcasting tower through examining the measurement of a GPS system. However, the prior art technology is feasible only when the environment of broadcast signal reception is as favorable as no interruptions, such as mountains or buildings, between the movable vehicle and the broadcasting tower. Therefore, if any interruption exists between the vehicle and the broadcasting tower, the intensity of a received broadcast signal may not be optimum along the direction extending from the vehicle to the broadcasting tower. Moreover, the prior art technology fails to improve the response to a desired broadcast signal through utilizing reflections of the broadcast signal. Accordingly, the response to a desired broadcast signal will be improved with less certainty.

DISCLOSURE OF THE INVENTION

A mobile receiver apparatus comprises: a directivity variable antenna; an antenna controller connected with the directivity variable antenna for conducting a control action to align the directivity with a desired direction; and an optimum directivity calculator connected with the antenna controller for calculating from the current position of a mobile and its surrounding geographical features an optimum pattern of the directivity for improving the response to a desired broadcast signal.

DETAILED DESCRIPTION OF THE PREFERRED EMBODIMENTS

A mobile receiver apparatus according to the present invention is designed for eliminating the drawbacks of the above described conventional technology. The mobile receiver apparatus comprises at least a directivity variable antenna, an antenna controller connected with the directivity variable antenna for conducting a control action to align the directivity with a desired direction, and an optimum directivity calculator connected with the antenna controller for calculating an optimum pattern of the directivity from the current position and geographical features. This arrangement allows the direction to be calculated for improving the response to a desired broadcast signal and simultaneously the directivity variable antenna to be controllably operated to face the direction, whereby the desired broadcast signal can be received at an optimum condition.

More particularly, the mobile receiver apparatus according to the present invention is arranged to calculate a desired pattern of the antenna directivity from its current position and surrounding geographical features and controllably drive the directivity variable antenna to face the direction at which the response to a broadcast signal is improved. Accordingly, even when the mobile receiver apparatus is under an unstable condition where the environment of broadcast signal reception is varied as the mobile receiver apparatus moves, its antenna directivity can remain in an optimum pattern depending on the geographical features thus improving the response to a broadcast signal to be intercepted.

The present invention will now be described in more detail in conjunction with its preferred embodiments.

Embodiment 1

Embodiment 1 of the present invention will be described referring to the relevant drawings.

Figure 1:
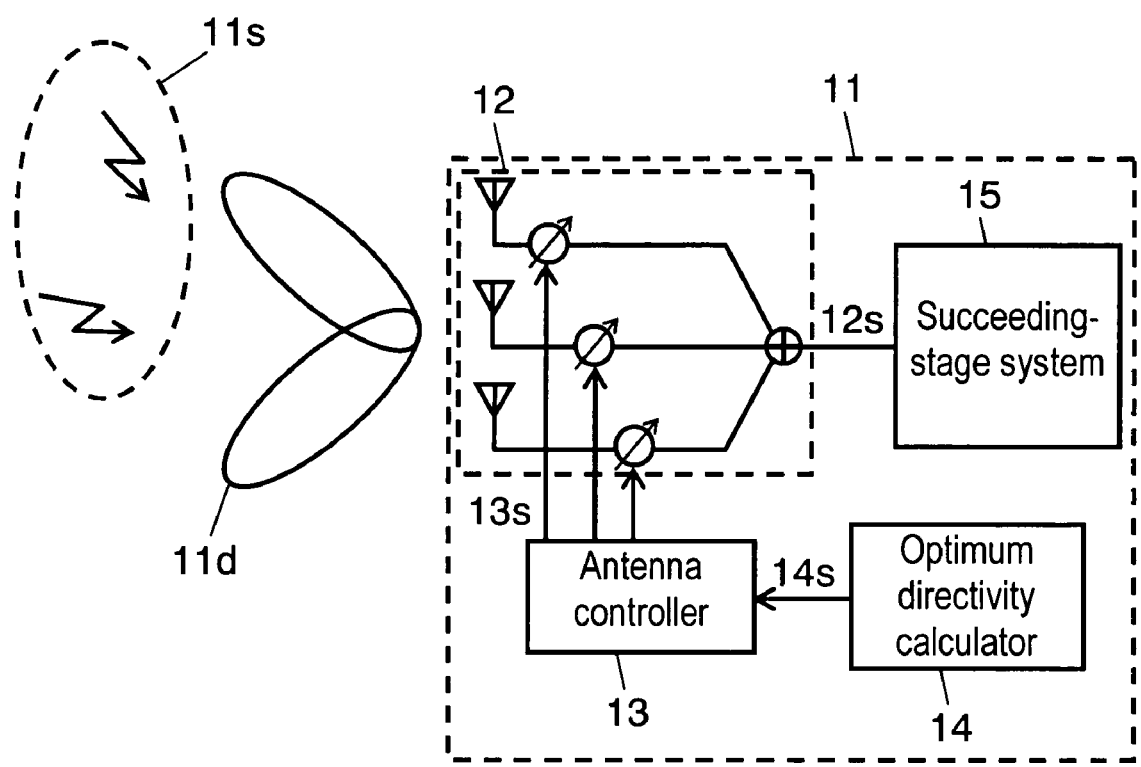
FIG. 1 is a circuitry block diagram of a mobile receiver apparatus showing one embodiment of the present invention.

FIG. 1 illustrates a mobile receiver apparatus according to Embodiment 1 of the present invention.

As shown in FIG. 1, the mobile receiver apparatus 11 comprises a directivity variable antenna 12, an antenna controller 13, an optimum directivity calculator 14, and a succeeding-stage system 15 for decoding and processing a composite signal 12s received from the directivity variable antenna 12 for playback action.

The optimum directivity calculator 14 is provided for delivering an antenna control data 14s. The antenna controller 13 is arranged responsive to the antenna control data 14s for delivering an antenna control signal 13s. The directivity variable antenna 12 is provided for receiving the antenna control signal 13s as well as a broadcast signal 11s and combining them to develop a composite signal 12s. As the composite signal 12s largely depends on the antenna control signal 13s, its waveform can be varied. More specifically, the directivity 11d of the antenna can actually be modified for increasing the response to a desired broadcast signal from one direction while decreasing the response to interference signals from the other directions.

The mobile receiver apparatus of Embodiment 1 commands the optimum directivity calculator 14 to calculate the direction, in which the broadcast signal 11s is received at optimum, from the current position and the surrounding geographical features including mountains and buildings about the mobile receiver apparatus 11. As its antenna directivity 11d is controllably determined in the desired direction, the mobile receiver apparatus 11 generates and transfers the composite signal 12s including the desired signal at optimum level to the succeeding-stage system 15, thus improving its response to the broadcast signal.

The action of the mobile receiver apparatus controllably determining an optimum pattern of the directivity of the antenna from the current position and the surrounding geographical features will be described in more detail, referring to FIGS. 2 to 4.

Figure 2:
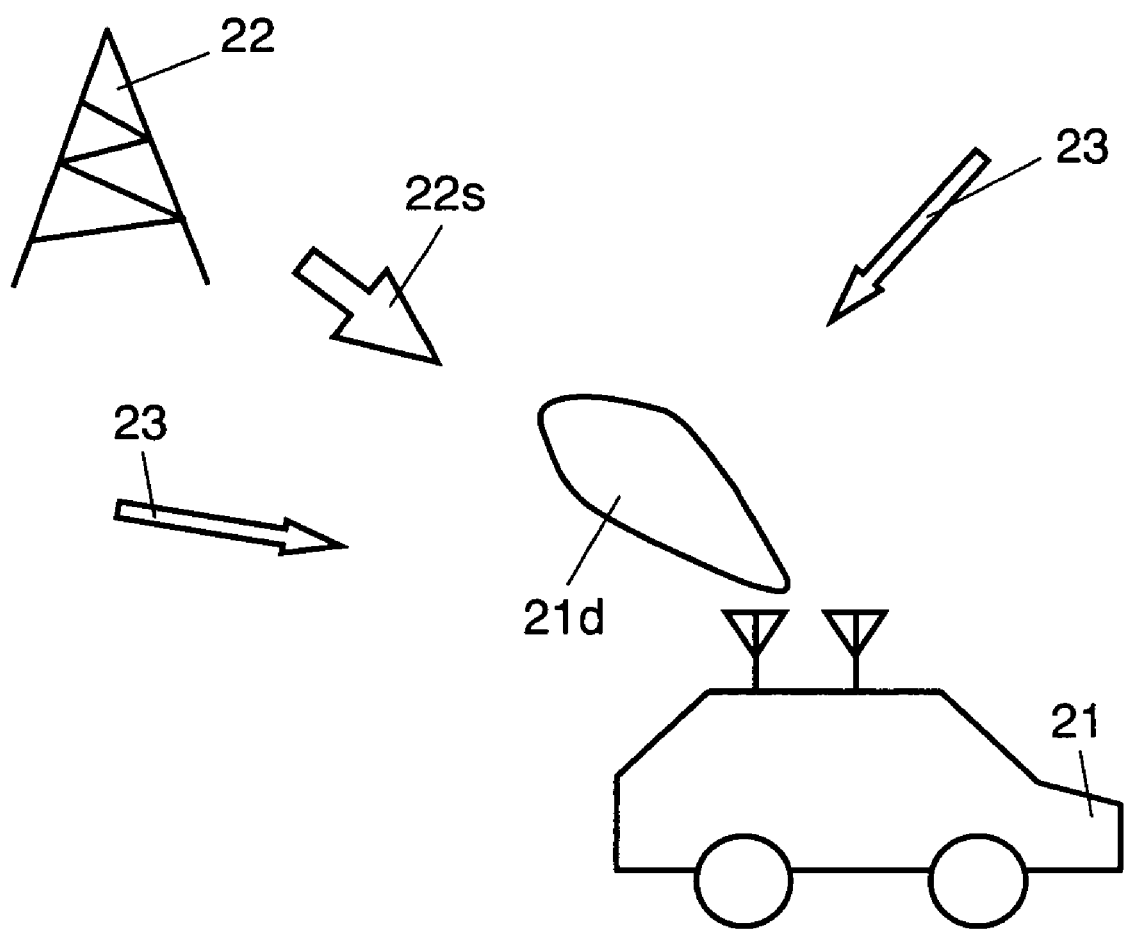
FIG. 2 is an explanatory view of the mobile receiver apparatus of the embodiment being used in a clear environment for broadcast signal reception.

FIG. 2 is an explanatory view illustrating an action of the mobile receiver apparatus under a clear environment of signal reception. In FIG. 2, there are no obstacles, such as high buildings or mountains, which may interrupt or reflect the broadcast signal 22s from a broadcasting tower 22, about a mobile 21 on which the mobile receiver apparatus 11 is carried, allowing the broadcast signal 22s to be received under a clear environment for broadcast signal reception.

The optimum directivity calculator 14 in the mobile receiver apparatus 11 examines, for example, the positional relationship between the mobile 21 and the broadcasting tower 22 calculated from the position of the mobile 21 and the position of the broadcasting tower 22 together with the clear environment about the mobile 21 towards the broadcasting tower 22 to determine that the signals at the same frequency range received from the other directions are unwanted signals 23 which may disturb the response to the broadcast signal. In other words, the optimum directivity calculator 14 judges that it is most preferable for the antenna directivity to be aligned with the broadcasting tower 22.

The judgment then instructs the antenna controller 13 to locate the directivity variable antenna 12 at such a position that the antenna directivity 21d aligns with the direction of the broadcasting tower 22, improving the response to a desired broadcast signal.

Figure 3:
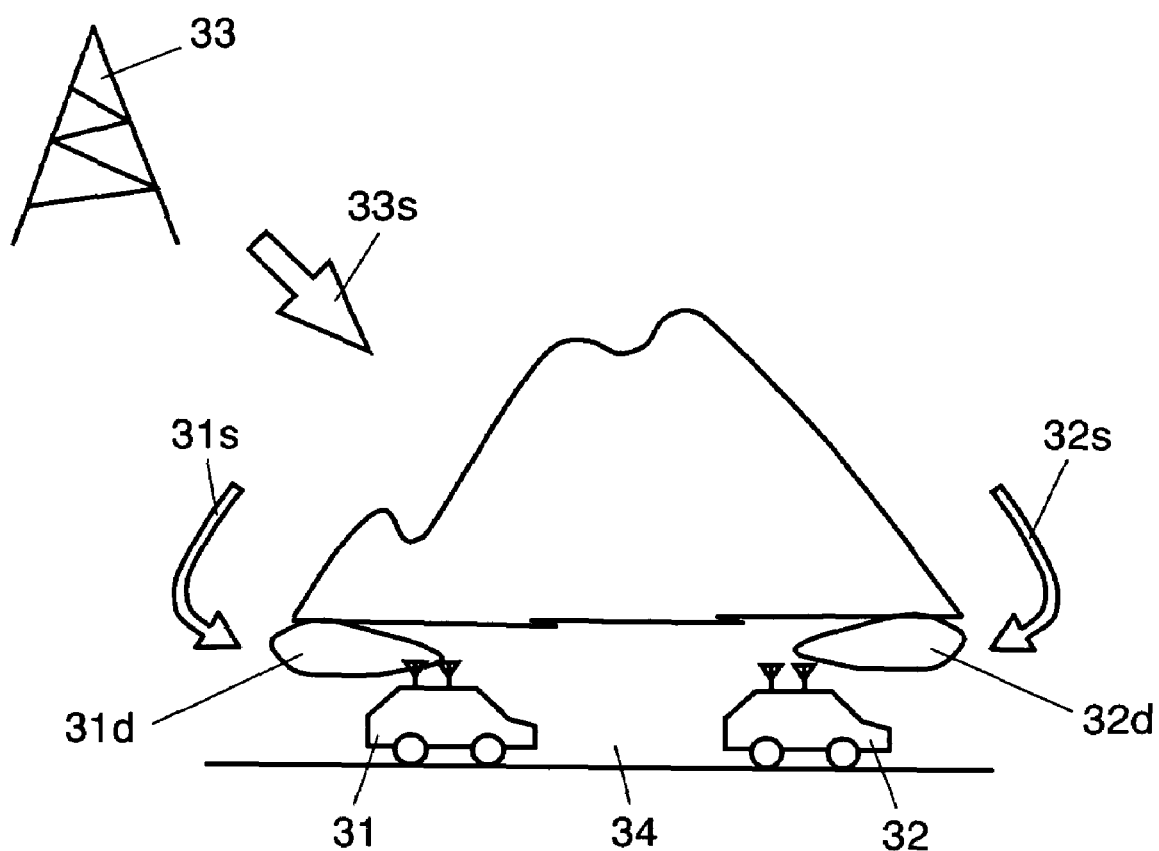
FIG. 3 is an explanatory view of the mobile receiver apparatus of the embodiment being used in a tunnel.

FIG. 3 is an explanatory view illustrating another action of the mobile signal reception where two mobiles 31 and 32 receive a broadcast signal 33s from a broadcasting tower 33 while running through a tunnel 34.

In FIG. 3, the mobile 31 runs adjacent to the entrance of the tunnel 34. This prevents the antenna directivity from being enhanced even when aligning with the direction of the broadcasting tower 33 as determined by the optimum directivity calculator 14 of the mobile receiver apparatus 11 on the mobile 31. In this case, a broadcast signal 31s entering from the entrance of the tunnel 34 is dominant and it is judged that the antenna directivity 31d can be improved when aligning with the entrance of the tunnel 34.

Also, when the mobile 32 runs adjacent to the exit of the tunnel 34, a broadcast signal 32s entering from the exit of the tunnel 34 is dominant. It is hence judged that the antenna directivity 32d can be improved when aligning with the exit of the tunnel 34.

Using the judgment, the antenna controller 13 commands the directivity variable antenna 12 to align its antenna directivity with the entrance or exit of the tunnel 34 for improving the response to a desired broadcast signal.

Figure 4:
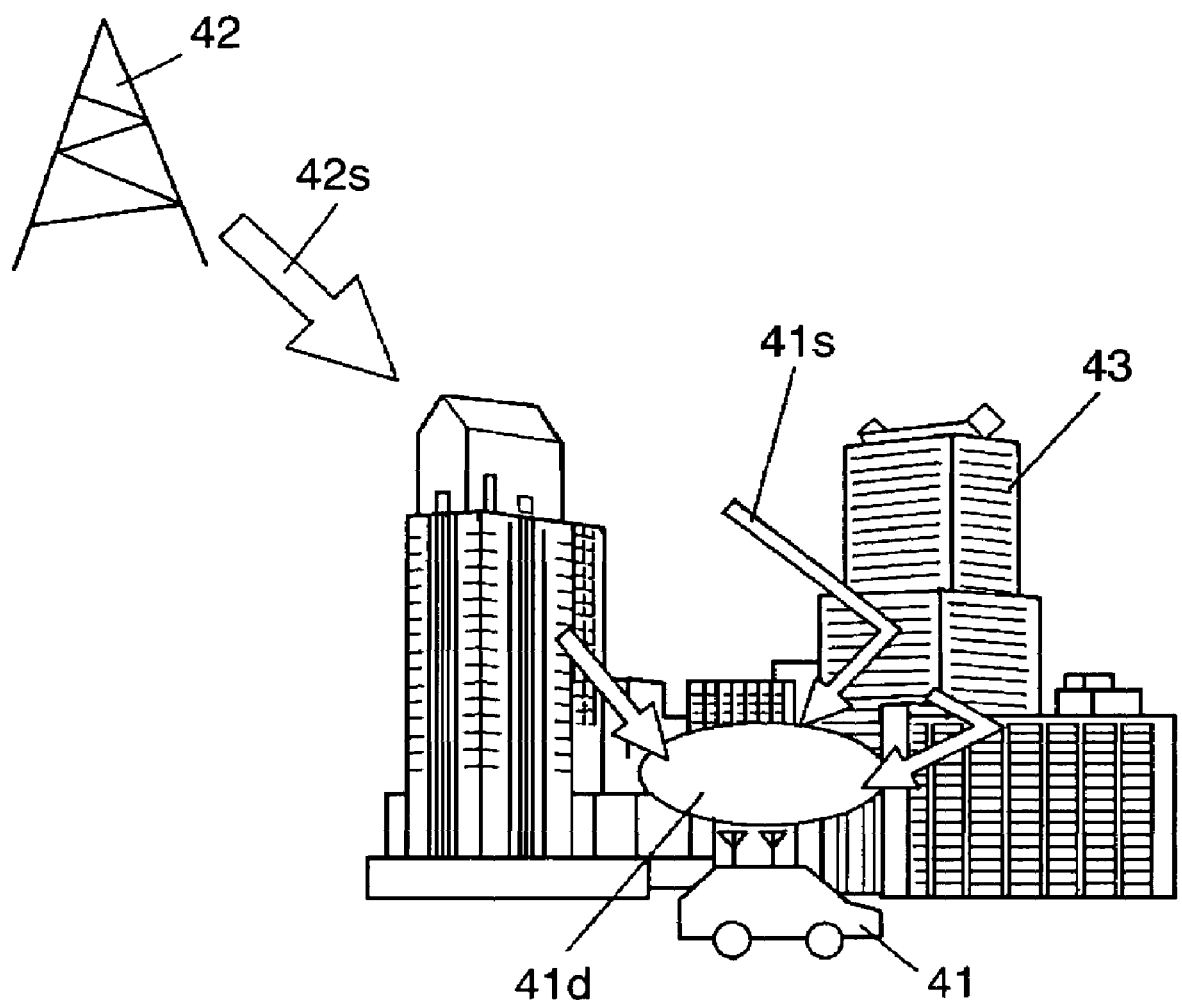
FIG. 4 is an explanatory view of the mobile receiver apparatus of the embodiment being used in a hostile environment for broadcast signal reception.

FIG. 4 is an explanatory view illustrating a further action of the mobile receiver apparatus where a mobile 41 receives a broadcast signal 42s from a broadcasting tower 42 while running between skyscrapers 43 in a city.

As shown in FIG. 4, the skyscrapers 43 interfere between the mobile 41 and the broadcasting tower 42, thus interrupting the interception of the broadcast signal 42s. In addition, as the broadcast signal 42s reflects on the skyscraper 43 at the opposite side, its reflection 41s is received by the mobile 41.

In such a hostile environment of signal reception, components of the desired signal are received from different directions. When the antenna directivity is modified to an omnidirectional pattern 41d, reflected components 41s of the desired signal can be received from all the directions. In action, the antenna controller 13 commands the directivity variable antenna 12 to modify its antenna directivity to an omnidirectional pattern 41d, thus improving the response to the desired broadcast signal.

It is noted that the broadcast signal 42s is higher in the intensity at a location close to the broadcasting tower 42. At the location, when the antenna directivity 41d is directly aligned with the broadcasting tower 42, its response to the broadcast signal may be declined. It is hence preferable to modify the antenna directivity to a pattern slightly biased from the direction of the broadcasting tower 42. Also, when an attention has been given in advance that the antenna directivity at a location is improved by aligning with one particular direction, it can be used to modify the antenna directivity to an optimum pattern for improving the response to a desired broadcast signal.

Embodiment 2

Embodiment 2 of the present invention will now be described referring to the relevant drawing.

Figure 5:
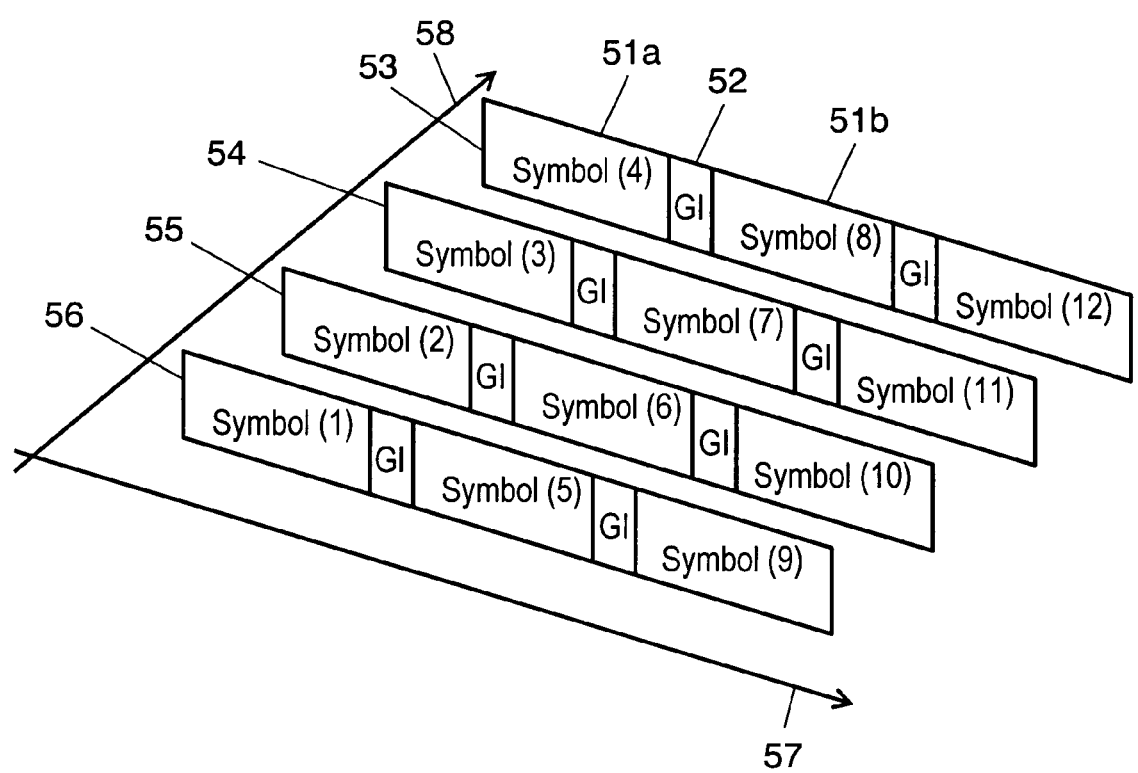
FIG. 5 is an explanatory view showing another embodiment of the present invention where symbols are transmitted in the OFDM transmission mode.

FIG. 5 illustrates a transmission format of symbol data along the time base and the frequency base in the OFDM transmission method employed by the digital broadcast system in Japan. The OFDM transmission method allows various data including symbols to be transmitted with time on a multiplicity of carriers. A carrier 53 along the time base 57 contains a slice of time 52 called guard interval between two symbols 51a and 51b (referred to as a GI interval hereinafter as denoted by GI in FIG. 5). The GI interval 52 carries a copy of the waveform at the leading end of the symbol 51a. As the GI interval 52 is a redundant period, it may decline the transmission rate. However, the presence of the GI intervals 52 will increase the resistance against to ghost interference derived from the multi-path waveform.

According to the present invention, the action of the directivity variable antenna 12 can be controlled by the antenna controller 13 referring to a directivity control data determined by the optimum directivity calculator 14 for improving the response to a desired broadcast signal. In particular, Embodiment 2 allows the action of the antenna controller 13 controlling the directivity variable antenna 12 according to Embodiment 1 to be timed with the GI intervals 52 which are redundant periods, thus improving further the response to a desired broadcast signal which depends on the directivity control action.

As described, the foregoing embodiment is based on the OFDM transmission method employed in the digital broadcast system in Japan. However, the present invention is not limited to the OFDM transmission method but may be applied to any transmission method which has redundant periods equal to the GI intervals 52.

Embodiment 3

Embodiment 3 of the present invention will be described referring to the relevant drawing.

Figure 6:
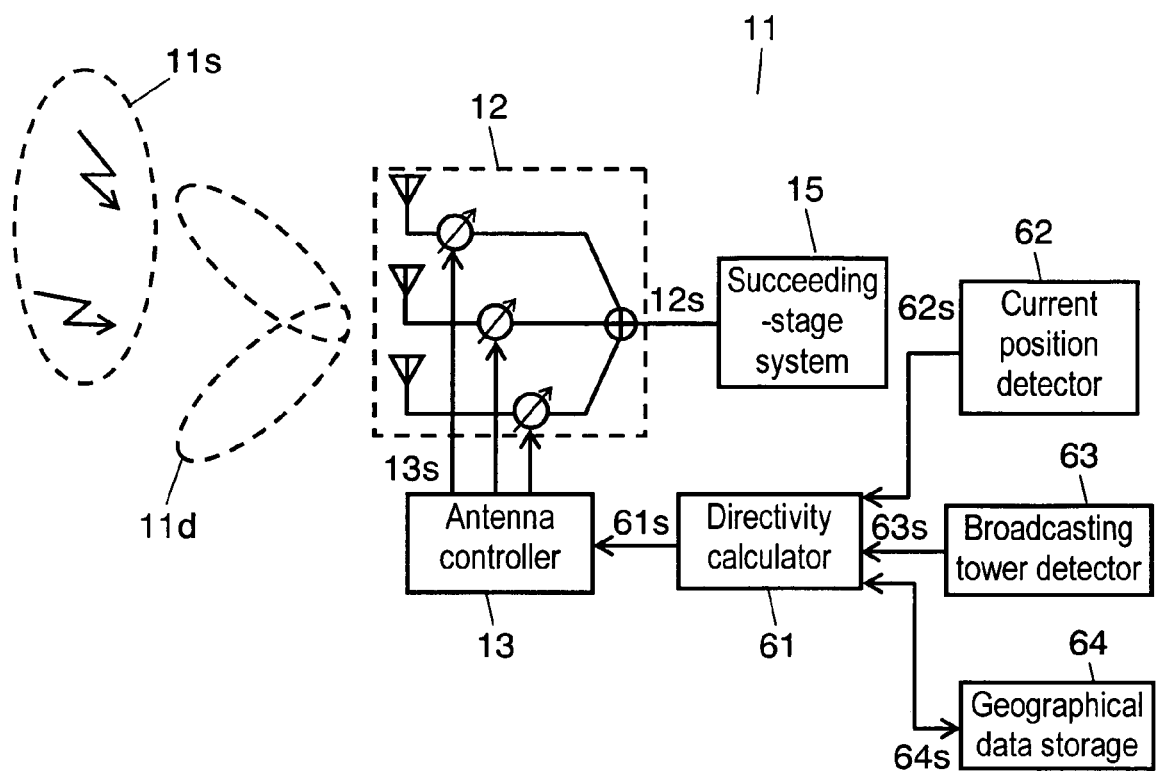
FIG. 6 is a block diagram of a mobile receiver apparatus showing a further embodiment of the present invention.

FIG. 6 illustrates an arrangement of a mobile receiver apparatus according to Embodiment 3 of the present invention.

As shown in FIG. 6, the mobile receiver apparatus of Embodiment 3 is arranged, in addition to the components of the mobile receiver apparatus 11 shown in FIG. 1, in that the optimum directivity calculator 14 as a functional block comprises at least a directivity calculator 61, a current position detector 62, a broadcasting tower position retriever 63, and a geographical data storage 64. The current position detector 62 is arranged to detect the current position of the mobile with the use of an applicable means such as a GPS device. The broadcasting tower detector 63 is arranged to detect the position of an available broadcasting tower, for example, from a recording medium such as a DVD or a HDD or via a communications unit from the outside. The geographic features storage 64 is arranged to save a list of geographical features including mountains and building structures together with a map data in its recording area.

In action, the directivity calculator 61 calculates the positional relationship between the mobile and the broadcasting tower from a current position data 62s received from the current position detector 62, which indicates the current position of the mobile, and a broadcasting tower position data 63s received from the broadcasting tower position retriever 63.

The directivity calculator 61 supplies the geographical data storage 64 with the current position data 64s of the mobile for receiving geographical features about the mobile at the current position or between the mobile and the broadcasting tower. Using those information, the directivity calculator 61 determines an optimum pattern of the antenna directivity for receiving the broadcast signal 11s.

Accordingly, the mobile receiver apparatus 11 allows the antenna controller 13 to receive an antenna control data 61s calculated from the optimum directivity by the directivity calculator 61 and generate an antenna control signal 13s which is in turn transferred to the directivity variable antenna 12, hence improving its response to the broadcast signal.

Embodiment 4

Embodiment 4 of the present invention will be described referring to the relevant drawing.

Figure 7:
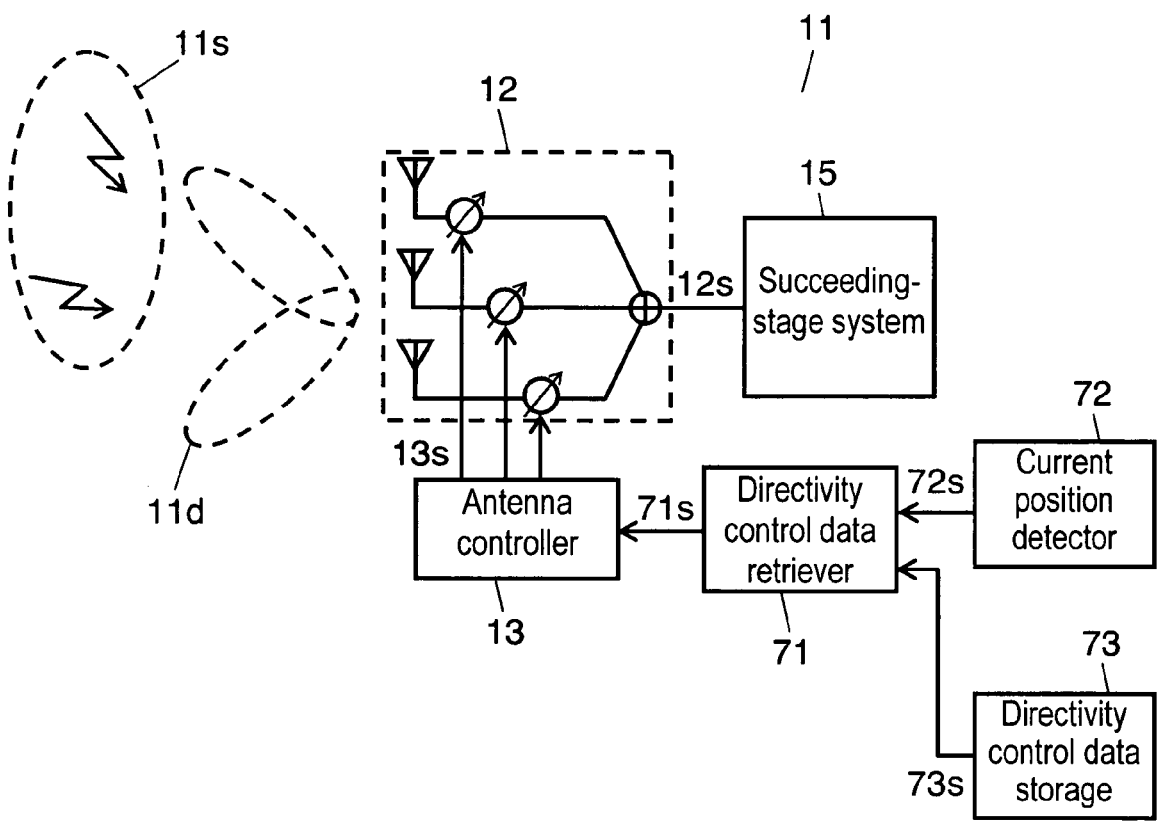
FIG. 7 is a block diagram of a mobile receiver apparatus showing a still further embodiment of the present invention.

FIG. 7 illustrates an arrangement of a mobile receiver apparatus according to Embodiment 4 of the present invention.

As shown in FIG. 7, the mobile receiver apparatus of Embodiment 4 is arranged, in addition to the components of the mobile receiver apparatus 11 shown in FIG. 1, in that the optimum directivity calculator 14 as a functional block comprises at least a directivity control data retriever 71, a current position detector 72, and a directivity control data storage 73. The current position detector 72 is arranged to detect the current position of the mobile with the use of an applicable means such as a GPS device. The directivity control data storage 73 is arranged to save directivity control data in relation with the current position or geographical features about the current position in its recording medium such as a DVD or a HDD.

In action, the directivity control data retriever 71 receives the current position data 72s of the mobile from the current position detector 72 and supplies the directivity control data storage 73 with the current position data 72s for retrieving the directivity control data 73c saved in relation with the current position or the geographical features about the current position.

The directivity control data storage 73 saves each piece of the directivity control data assigned with its absolute position; for example, when the absolute position is A, the signal received from the X direction is intensified, the signal received from the Y direction is lagged by a time τ, and both the signals are combined together while the signal received from the Z direction remains not combined. Alternatively, the directivity control data may be modified in which when the absolute position A is in a geographic pattern P, the signal received from the X direction is intensified before combined.

Accordingly, the mobile receiver apparatus 11 allows the antenna controller 13 to receive an antenna control data 71s determined from the directivity control data 73s by the directivity control data retriever 71 and generate an antenna control signal 13s which is in turn transferred to the directivity variable antenna 12, hence improving its response to the broadcast signal 11s.

Embodiment 5

Embodiment 5 of the present invention will be described referring to the relevant drawing.

Figure 8:
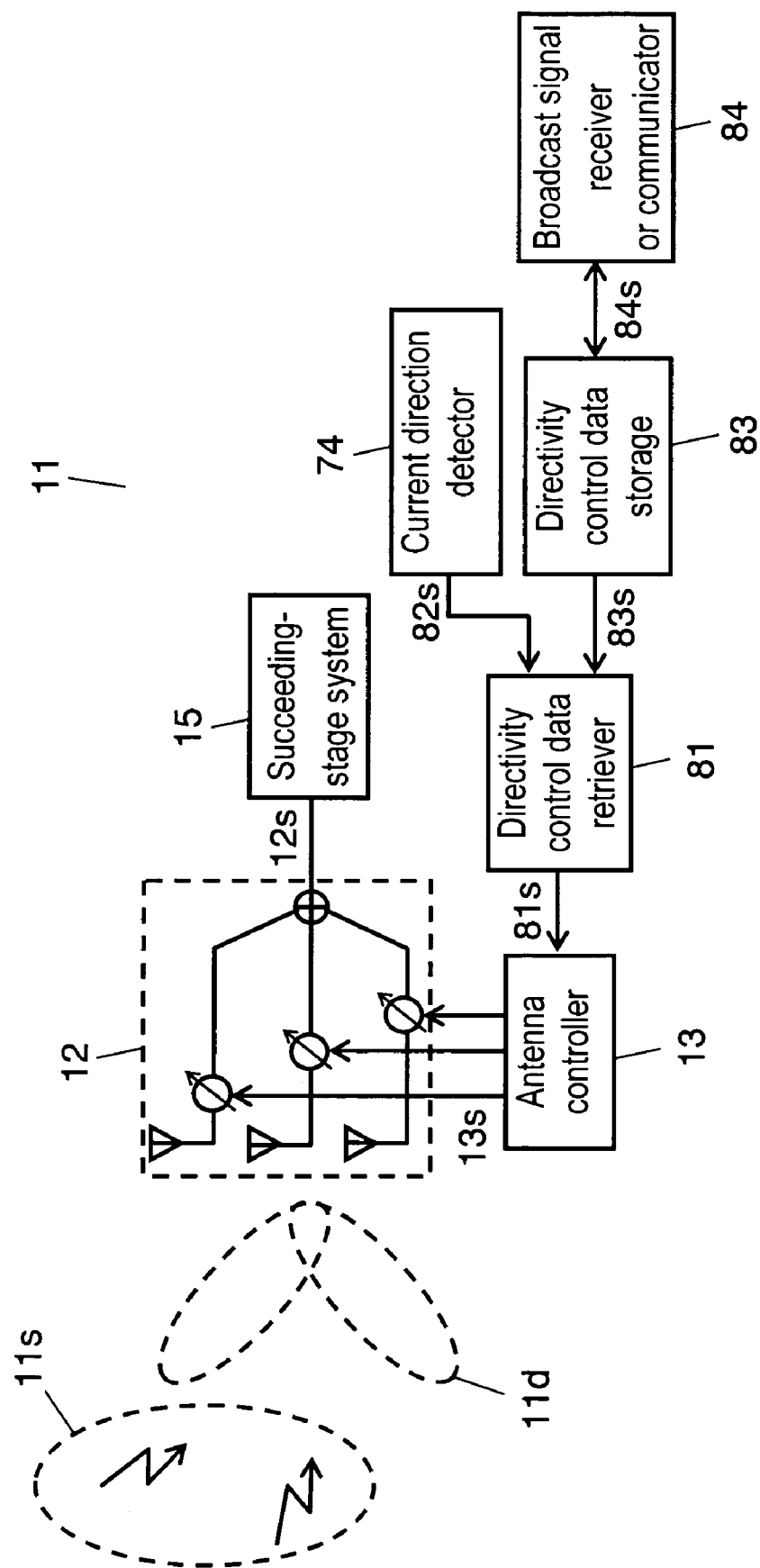
FIG. 8 is a block diagram of a mobile receiver apparatus showing a still further embodiment of the present invention.

FIG. 8 illustrates an arrangement of a mobile receiver apparatus according to Embodiment 5 of the present invention.

As shown in FIG. 8, the mobile receiver apparatus of Embodiment 5 is arranged, in addition to the components of the mobile receiver apparatus shown in FIG. 7, further comprising a broadcast signal receiver or communicator 84 connected with the directivity control data storage 83.

The directivity control data storage 83 is arranged to save the directivity control data in relation to the current position of the mobile 11 or geographical features about the current position. Also, the directivity control data storage 83 is arranged to modify or update the directivity control data 83s with another piece of the directivity control data 84s which has been received from the broadcast signal receiver or communicator 84. This allows the directivity control data 83s to be updated or added with another piece of the directivity control data 84s for corresponding to a change in the geographical features, for example, a new building is added.

response to the broadcast signal 11s.

Embodiment 6

Embodiment 6 of the present invention will be described referring to the relevant drawing.

Figure 9:
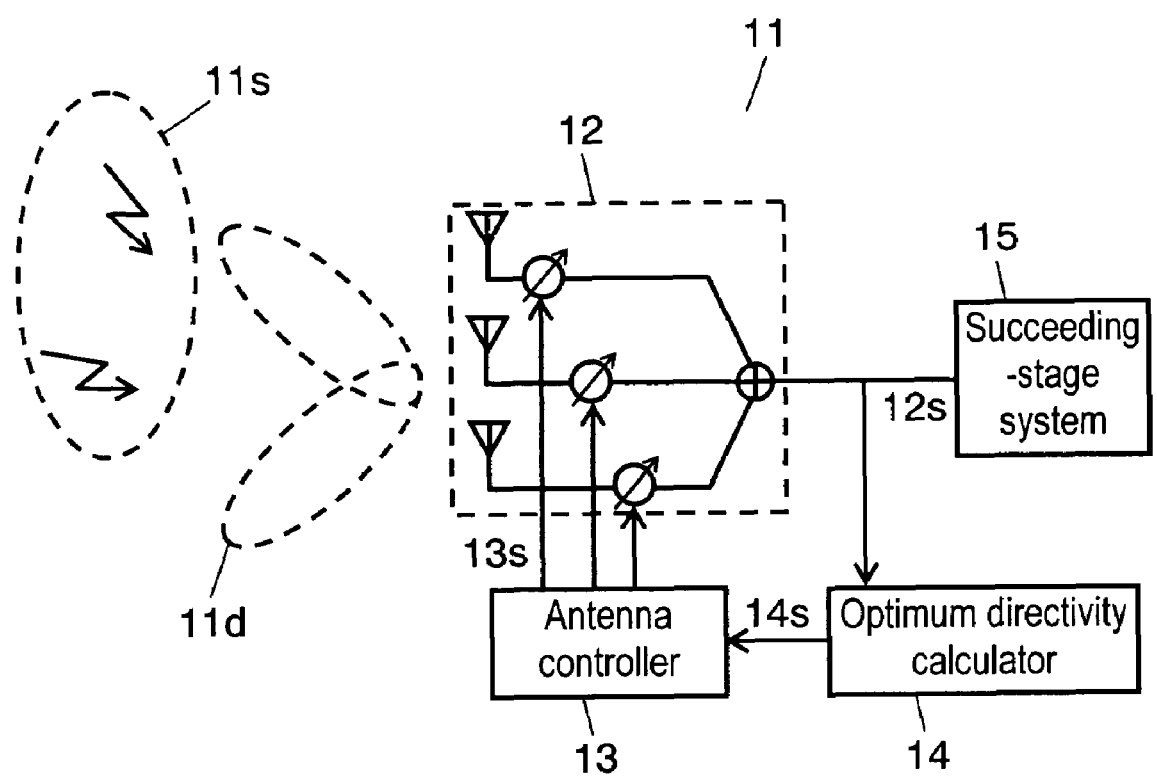
FIG. 9 is a block diagram of a mobile receiver apparatus showing a still further embodiment of the present invention.

FIG. 9 illustrates an arrangement of a mobile receiver apparatus according to Embodiment 6 of the present invention.

As shown in FIG. 9, the mobile receiver apparatus 11 is arranged, as a modification of the mobile receiver apparatus 11 shown in FIG. 1, in that the optimum directivity calculator 14 is connected with an output or composite signal 12s released from the directivity variable antenna 12.

This allows the optimum directivity calculator 14 to calculate an optimum pattern of the directivity from the current position of the mobile 11 and the geographic features about the mobile 11 with the help of an update data signal.

As the environment for broadcast signal reception is varied with time depending on not only the positional relationship between the mobile 11 and the broadcasting tower or the geographical features about the mobile 11 but also the moving speed, acceleration rate, or condition of the mobile 11, the antenna directivity will change in the optimum pattern. Accordingly, the response to a desired broadcast signal can further be improved by modifying the antenna directivity with an update data signal derived from the broadcast signal received at the moment.

In practice, an optimum pattern of the directivity is calculated from the current position and geographic features upon the start up of receiving the broadcast signal or periodically at equal intervals of a time and used for conducting the control action over the antenna. In addition to the periodical calculation, the composite signal 12s is examined for finely modifying the directivity. As a result, the antenna directivity can be improved even in a not constant but unstable environment for broadcast signal reception.

INDUSTRIAL APPLICABILITY

Each mobile receiver apparatus according to the present invention has an advantage of inhibiting the antenna response to a desired broadcast signal from being declined as it moves and can thus favorably be used in a moving mobile, such as an automobile or a train, for intercepting television, FM, and AM broadcast signals.

The invention claimed is:

1. A mobile receiver apparatus comprising:
   a directivity variable antenna including a plurality of antenna elements;
   an antenna controller connected with the directivity variable antenna for controlling the directivity of said antenna; and
   an optimum directivity calculator coupled to the antenna controller for calculating a pattern for the directivity of the antenna by determining (1) whether to align the plurality of antenna elements in one direction so that antenna directivity is in said direction and (2) whether to align at least one of the plurality of antenna elements in a direction different from at least another one of the plurality of antenna elements so that antenna directivity is omni directional;
   wherein the optimum directivity calculator includes:
      a current position detector for detecting the current position of the mobile receiver apparatus; and
      a geographic data storage for storing geographical features which have respective height components in proximity to the current position of the mobile receiver apparatus, at least one stored geographical feature including a height component having a height different than a height of the mobile receiver apparatus; and
   the pattern for the directivity of the antenna is further calculated by a combination of the current position of the mobile receiver apparatus and the height component of the at least one stored geographical feature.

2. A mobile receiver apparatus according to claim 1, wherein the antenna controller is arranged to conduct its control action over the directivity variable antenna in guard intervals which are assigned by an applicable digital broadcast system.

3. A mobile receiver apparatus according to claim 1,
   wherein the optimum directivity calculator comprises at least:
      a directivity calculator;
      a broadcasting tower position retriever for detecting the position of a broadcast tower; and
   wherein the directivity calculator calculates an optimum pattern of the directivity for improving the response to a desired broadcast signal from the positional relationship between the mobile receiver apparatus and the broadcasting tower further determined by the position of the broadcast tower; and
   wherein the antenna controller conducts the control action over the directivity variable antenna corresponding to the output of the directivity calculator.

4. A mobile receiver apparatus according to claim 1,
   wherein the optimum directivity calculator comprises at least:
      a directivity control data retriever;
      a current position detector for detecting the current position of the mobile receiver apparatus; and
      a directivity control data storage for storing a directivity control data determined from the current position or the geographic data about the current position;
   wherein the directivity control data retriever examines the current position of the mobile receiver apparatus received from the current position detector to retrieve a corresponding directivity control data from the directivity control data storage; and
   wherein the antenna controller conducts the control action over the directivity variable antenna.

5. A mobile receiver apparatus according to claim 4, wherein the directivity control data storage is connected with a broadcast signal receiver or communicator for receiving directivity control data via the broadcast signal receiver or communicator to update or modify the directivity control data assigned to the current position or the geographical features.

6. A mobile receiver apparatus according to claim 1,
   wherein the directivity variable antenna is connected at the output to the optimum directivity calculator; and
   wherein the optimum directivity calculator is arranged to calculate an optimum pattern of the directivity using an output of the directivity variable antenna.

* * * * *